United States Patent

Berkman et al.

Patent Number: 5,313,823
Date of Patent: May 24, 1994

[54] ELECTRICAL CABLE LEAK DETECTION SYSTEM

[75] Inventors: Samuel Berkman, Sun Lakes; Jack A. Sahakian, Phoenix, both of Ariz.

[73] Assignee: W. L. Gore & Associates, Inc., Newark, Del.

[21] Appl. No.: 29,074

[22] Filed: Mar. 10, 1993

Related U.S. Application Data

[63] Continuation-in-part of Ser. No. 1,377, Jan. 7, 1993, abandoned, which is a continuation-in-part of Ser. No. 897,466, Jun. 11, 1992, abandoned.

[51] Int. Cl.⁵ .............................................. G01M 3/16
[52] U.S. Cl. ...................................... 73/40; 174/11 R
[58] Field of Search ............... 73/40, 40 SR; 340/605; 174/11 R, 25 C, 25 R

[56] References Cited

U.S. PATENT DOCUMENTS

| | | | |
|---|---|---|---|
| 2,717,917 | 9/1955 | Isenberg | 174/25 C |
| 4,710,353 | 12/1987 | Tanaka et al. | 73/40 X |
| 4,877,923 | 10/1989 | Sahakian | 174/11 R |
| 4,918,977 | 4/1990 | Takahashi et al. | 73/40.5 R |
| 4,926,165 | 5/1990 | Lahlouh et al. | 73/40 X |
| 5,101,657 | 4/1992 | Lahlouh | 73/40 X |
| 5,177,996 | 1/1993 | Sahakian | 73/40 |

FOREIGN PATENT DOCUMENTS

| | | | |
|---|---|---|---|
| 0289257 | 11/1988 | European Pat. Off. | 73/40 |
| 0341933 | 11/1989 | European Pat. Off. | |
| 2218836 | 11/1989 | United Kingdom | 73/40 |
| 2245977 | 1/1992 | United Kingdom | |

Primary Examiner—Hezron E. Williams
Assistant Examiner—Joseph W. Roskos
Attorney, Agent, or Firm—Gary A. Samuels

[57] ABSTRACT

A leak detection cable for detecting aqueous based liquids that contain a surfactant is composed of an insulated wire conductor (1 and 2) wrapped with a water resistant yarn (3) and a braided second conductor (4).

7 Claims, 1 Drawing Sheet

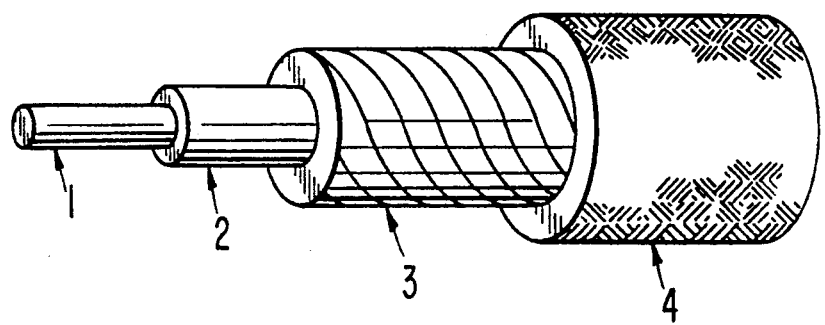

ELECTRICAL CABLE LEAK DETECTION SYSTEM

CROSS REFERENCE TO RELATED APPLICATIONS

This application is a continuation-in-part of application Ser. No. 08/001,377, now abandoned, filed Jan. 7, 1993, which is a continuation-in-part of application Ser. No. 07/897,466, now abandoned, filed Jun. 11, 1992.

FIELD OF THE INVENTION

This invention relates to a cable based leak detection system in which the cable is substantially water resistant but can detect water based liquids that contain a surfactant. It is particularly useful to detect leaks from cleaning tanks or storage tanks and their associated piping.

BACKGROUND OF THE INVENTION

The piping from cleaning and storage tanks which store aqueous solutions frequently are exposed to the elements of weather. An aqueous solution leak detection system for such piping therefore needs to be water resistant but must still be able to detect the presence of water in a solution. Aqueous solutions frequently have detergents in them, and it would be beneficial to have a leak detection system that was based on the presence or absence of a surfactant in the leaking liquid. This is especially true for aqueous acids or bases that contain a surfactant. Many systems for detecting leaking acids or bases depend on the corrosive effect of the acid or base on a metal conductor for detection means. For example, EPA 017174 measures a capacitance change that occurs upon destruction of an aluminum shield when the cable is attacked by acid; and in PCT WO 89/05446 an insulation between two conductors is impregnated with an acid-sensitive additive which reacts with acid and changes the impedance of the insulation. However, such systems tend to act only slowly or only with concentrated acids and may be liable to breakdown through contact with environmental corrosives.

SUMMARY OF THE INVENTION

According to the present invention there is provided an electrical cable that is substantially water-resistant, but which detects the presence of water that contains a surfactant, said cable comprising:
 a central electrical conductor (1),
 a water-impermeable plastic insulation (2) covering said conductor,
 a water-resistant, surfactant-free, hydrophobic yarn (3) wrapped closely around the insulation-covered conductor, said yarn comprising a polymeric material,
 a second electrical conductor (4) surrounding the yarn-wrapped, insulated central conductor, said second electrical conductor being water permeable.

Preferably the yarn is coated with a hydrophobic polymer unless the yarn is normally hydrophobic.

In operation, an aqueous solution containing a surfactant will penetrate through the second electrical conductor (4) and contact the water resistant wrapped yarn (3). Upon contact, the surfactant in the aqueous solution will alter the water resistant nature of the yarn by changing its surface tension and the yarn will absorb some of the water in the aqueous solution. This changes the dielectric constant of the yarn, which can be detected by equipment for recording changes in capacitance or impedance.

BRIEF DESCRIPTION OF THE DRAWING

The drawing depicts a cable of the invention.

DESCRIPTION OF THE INVENTION

Referring to the drawing, electrical conductor 1 can be any metallic conductive wire. Examples include copper, aluminum, nickel plated copper wire, or the like.

The water impermeable plastic insulation 2 can be any polymeric insulation. It can be a thermoplastic polymer of polyvinylchloride, polychlorotrifluoroethylene, a copolymer of tetrafluoroethylene and hexafluoropropylene, a copolymer of tetrafluoroethylene and perfluoropropyl vinyl ether, a copolymer of tetrafluoroethylene and ethylene, polyvinyl chloride, and the like. These polymers can be extruded around the conductive wire 1 to form an insulated wire. Preferably, the insulation 2 is a copolymer of tetrafluoroethylene and perfluoropropylvinyl ether.

The water resistant, i.e, hydrophobic yarn (3) acts in this invention as the dielectric-changing element. The yarn can be a polyolefin such as polyethylene, polybutylene or polypropylene and is preferably coated with a silicone to increase hydrophobicity. Silicone coated polypropylene is available commercially from Philips Fiber Company. The yarn can also be a polytetrafluoroethylene yarn preferably an expanded, porous polytetrafluoroethylene yarn. The yarn is wrapped helically and closely around the insulated conductor, so that water cannot penetrate it. With the water-repellancy in combination with the tight winding of the yarn, good water-repellency is imparted to the cable.

Surrounding the aforedescribed construction is a second metallic conductor 4 that may be resistant to acid or base depending on the end use. Steel, preferably stainless steel is preferred. This second conductor must be water permeable and therefore is usually made of a braid of strands of the metal.

In one embodiment, a 14 gauge, 19 strand nickel-plated copper wire was used as the central conductor (1). An insulation (2) of a copolymer of tetrafluoroethylene and perfluoropropylvinyl ether (DuPont Company Teflon ® PFA fluoropolymer) was extruded onto and around the wire. The copolymer provides a waterproof barrier that protects the central conductor. A silicone-coated polypropylene yarn (3) obtained from Philips Fiber Company was spirally wound around the insulated wire taking care to wrap the yarn (3) tightly so the adjacent windings abut. Next, a braided wire layer (4) made of stainless steel was applied around the wrapped and insulated wire. The silicone-coated yarn was wrapped around the central conductor to build up the diameter of the cable until the cable has a characteristic impedance of about 50 ohm.

The cable was used to detect leaks from acidic wash baths that contain a surfactant. Acid baths such as these are used to clean electronic equipment parts, and a surfactant is present to ensure good wetability of the part. A typical acid cleaning solution is an aqueous solution containing dodecylbenzene sulfonic acid and phenol surfactant.

When liquid from the wash bath leaks out and contacts the cable, the solution passes through the braided wire layer and contacts the silicone-coated yarn. Ordinarily, the silicone coated yarn is water-resistant. But the surfactant alters the surface tension of the silicone-coated yarn and renders the yarn more hydrophilic. The aqueous cleaning solution then penetrates the yarn and saturates it. This changes the dielectric constant of the yarn, which is detectable by sending electrical pulses down the cable and sensing the change in the pulse wave created by the change in the condition of the yarn.

A cable, prepared as described above, was subjected to water alone and a small capacitance change of two pecofarads over a five minute period was observed. Over the same period, a 1.5 ohm impedance change was observed. In contrast when the cable was subjected to a dodecylbenzene sulfonic acid and phenol surfactant aqueous solution, a capacitance change 219 picofards was observed over a time period of 5 minutes, along with an impedance change of 8 ohms.

We claim:

1. An electrical cable for detecting the presence of liquids containing a surfactant which comprises:
   a central electrical conductor,
   a water-impermeable plastic insulation covering said conductor,
   a water-resistant, surfactant-free yarn wrapped closely around the insulation-covered conductor, said yarn comprising a polymeric material,
   a second electrical conductor surrounding the yarn-wrapped, insulated central conductor, said second electrical conductor being water permeable.
2. The cable of claim 1 wherein the polymeric material is a polyolefin coated with a hydrophobic polymer.
3. The cable of claim 2 wherein the hydrophobic polymer is a silicone.
4. The cable of claim 1 wherein the polymeric material is polytetrafluoroethylene.
5. The cable of claim 4 wherein the polytetrafluoroethylene is expanded porous polytetrafluoroethylene.
6. The cable of claim 1 wherein the second electrical conductor is a metallic braid.
7. A method for detecting the presence of a surfactant-containing aqueous fluid which comprises:
   a) placing the cable of claims 1, 2, 3 or 4 adjacent a container holding the fluid,
   (b) sending an electrical pulse down the cable,
   (c) recording a change in the pulse created by a change in the condition of the yarn in the cable.

* * * * *